United States Patent
Fukushima et al.

(10) Patent No.: US 8,525,845 B2
(45) Date of Patent: Sep. 3, 2013

(54) DISPLAY CONTROL APPARATUS, METHOD, AND PROGRAM

(75) Inventors: Seigo Fukushima, Kanagawa (JP); Makoto Yamada, Tokyo (JP); Osamu Date, Tokyo (JP)

(73) Assignee: Sony Corporation (JP)

( * ) Notice: Subject to any disclaimer, the term of this patent is extended or adjusted under 35 U.S.C. 154(b) by 896 days.

(21) Appl. No.: 11/893,132

(22) Filed: Aug. 13, 2007

(65) Prior Publication Data

US 2008/0068374 A1 Mar. 20, 2008

(30) Foreign Application Priority Data

Aug. 21, 2006 (JP) .................. P2006-223891

(51) Int. Cl.
*G09G 5/00* (2006.01)
(52) U.S. Cl.
USPC .............. 345/581; 345/419; 345/440.2
(58) Field of Classification Search
None
See application file for complete search history.

(56) References Cited

U.S. PATENT DOCUMENTS

| | | | | |
|---|---|---|---|---|
| 7,725,839 | B2 * | 5/2010 | Michaels | 715/836 |
| 2003/0095145 | A1 * | 5/2003 | Patrizio et al. | 345/764 |

FOREIGN PATENT DOCUMENTS

| | | |
|---|---|---|
| EP | 1 098 254 A2 | 5/2001 |
| EP | 1 098 254 A3 | 5/2001 |
| EP | 1 622 024 A1 | 2/2006 |
| JP | 04205347 A | 7/1992 |
| JP | 10-312392 A | 11/1998 |
| JP | 11-215457 A | 8/1999 |
| JP | 2000324368 A | 11/2000 |
| JP | 2001-134578 A | 5/2001 |
| JP | 2003-303333 A | 10/2003 |
| JP | 2004-038698 A | 2/2004 |
| JP | 2004254221 A | 9/2004 |
| JP | 2004-320514 A | 11/2004 |

OTHER PUBLICATIONS

A. Girgensohn, J. Adcock, M. Cooper, J. Foote, L. Wilcox, "Simplifying the Management of Large Photo Collections", Sep. 3, 2003, Proceedings of INTERACT '03.*
R. Mander, G. Saloman, and Y.Y. Wong, "A 'Pile' Metaphor for Supporting Casual Organization of Information", May 7, 1992, ACM, Proceedings of the SIGCHI conference on Human factors in computing systems, pp. 627-634.*
Office Action from Japanese Application No. 2008-206780, dated Sep. 13, 2011.

* cited by examiner

*Primary Examiner* — Ulka Chauhan
*Assistant Examiner* — Robert Bader
(74) *Attorney, Agent, or Firm* — Lerner, David, Littenberg, Krumholz & Mentlik, LLP

(57) ABSTRACT

A display control apparatus which controls display of information about a group of data having a predetermined relevance, the apparatus may include a means for generating a three dimensional model for display in accordance with a first item of information of the information about the group; and a means for controlling display of a second item of information that is the information about the group and different from the first item of information so as to be overlaid on a three dimensional image displayed based on the model.

22 Claims, 10 Drawing Sheets

FIG. 4

| TIME INFORMATION (DAY, MONTH AND YEAR) | THE NUMBER OF FILES OF STILL IMAGES | THE NUMBER OF FILES OF MOVING IMAGES | STORAGE ADDRESS OF IMAGES REPRESENTED BY DAY | SIZE OF IMAGES REPRESENTED BY DAY |
|---|---|---|---|---|
| 2005.04.01 | 13 | 7 | 0x00002345 | 1234 |
| 2005.04.02 | 23 | 11 | 0x00001234 | 3456 |
| ... | ... | ... | ... | ... |
| 2006.05.05 | 32 | 22 | 0x000054321 | 4567 |

FIG. 7

| TIME INFORMATION (MONTH AND YEAR) | STORAGE ADDRESS OF IMAGES REPRESENTED BY MONTH | SIZE OF IMAGES REPRESENTED BY MONTH |
|---|---|---|
| 2005.01 | 0x0000321 | 987 |
| 2005.04 | 0x00002345 | 1234 |
| ⋮ | ⋮ | ⋮ |
| 2006.05 | 0x00054321 | 4567 |

# DISPLAY CONTROL APPARATUS, METHOD, AND PROGRAM

CROSS-REFERENCE TO RELATED APPLICATIONS

This application claims priority from Japanese Patent Application No. JP 2006-223891 filed in the Japanese Patent Office on Aug. 21, 2006, the entire content of which is incorporated herein by reference.

BACKGROUND OF THE INVENTION

1. Field of the Invention

The present invention relates to a display control apparatus and a method, and a program, particularly to a display control apparatus and a method, and a program which control display of information about grouped data.

2. Description of the Related Art

In a method of retrieving, reproducing and displaying images, it is proposed that a plurality of scaled down images for displaying indices are represented in a calendar (for example, see Patent Reference 1 (JP-A-11-215457)). In this case, for example, a scaled down image of a recorded taken image is shown in calendar representation for every date (day, month, and year), a user specifies a desired scaled down image, and then the specified image is retrieved, reproduced and displayed.

In addition, it is also proposed that both of information generated inside a device and recorded on a recording medium and information externally provided and recorded on a recording medium are classified based on creating date information without impairment of the advantages of classification (for example, see Patent Reference 2 (JP-A-2004-320514)).

However, in recent digital cameras, that is, in a digital video camera and a digital still camera, some of them can take both of still images and moving images, and many of them can record still image files and moving image files for respective images.

For a method of quickly retrieving target data from a large volume of data as described above, it is proposed that the shooting date and time of images and the number of taken images are depicted in a graph, that the creating date and time and the update date and time of documents and the number of documents are depicted in a graph and detail information is searched from a part of the graph, and that detail information is displayed on a list (for example, see Patent Reference 3 (JP-A-2001-134578)).

SUMMARY OF THE INVENTION

However, by the methods described above, it is difficult to quickly, easily grasp the numbers of images taken on the basis of months and on the basis of days.

In addition, in the case in which the index images are displayed, it is difficult to quickly, easily grasp the ratio of contents between taken still image files and moving image files.

In view of the circumstances, it is desirable to display a plurality of items of information about grouped data much easier.

An embodiment of the invention is directed to a display control apparatus which may control display of information about a group of data having a predetermined relevance, the apparatus may include a means for generating a three dimensional model for display in accordance with a first item of information of the information about the group; and a means for controlling display of a second item of information that is the information about the group and different from the first item of information so as to be overlaid on a three dimensional image displayed based on the model.

In the display control apparatus, a means may further be provided for selecting a third item of information that is the information about the group and different from the first item of information and the second item of information in response to a user instruction, wherein the generating means may generate the model in accordance with the selected third item of information.

The generating means may generate a subsequent model that displays a three dimensional image in a shape similar to the shape of a three dimensional image displayed based on the model.

The second item of information may be a representative image that represents images displayed in accordance with data belonging to the group, and the display control means may control display of the representative image on a surface of the three dimensional image.

The second item of information may be information about a ratio between types of data belonging to the group, and the display control means may control display of information about a ratio between types of the data on a surface of the three dimensional image.

Another embodiment of the invention is directed to a display control method of a display control apparatus which may control display of information about a group of data having a predetermined relevance, the method may include generating a three dimensional model for display in accordance with a first item of information of the information about the group; and controlling display of a second item of information that is the information about the group and different from the first item of information so as to be overlaid on a three dimensional image displayed based on the model.

A further embodiment of the invention is directed to a program which allows a computer to execute a process that may control display of information about a group of data having a predetermined relevance, the program may include generating a three dimensional model for display in accordance with a first item of information of the information about the group; and controlling display of a second item of information that is the information about the group and different from the first item of information so as to be overlaid on a three dimensional image displayed based on the model.

According to embodiments of the invention, a three dimensional model for display may be generated in accordance with a first item of information of information about a group, and a second item of information that is information about the group and different from the first item of information may be overlaid on the three dimensional image displayed based on the model.

As described above, according to embodiments of the invention, information about data can be displayed. In addition, according to embodiments of the invention, a plurality of items of information about grouped data can be displayed more clearly.

BRIEF DESCRIPTION OF THE DRAWINGS

FIG. 4 shows a diagram illustrative of an exemplary management file for days;

FIG. 7 shows a diagram illustrative of an exemplary management file for months;

DETAILED DESCRIPTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

Figure 2:
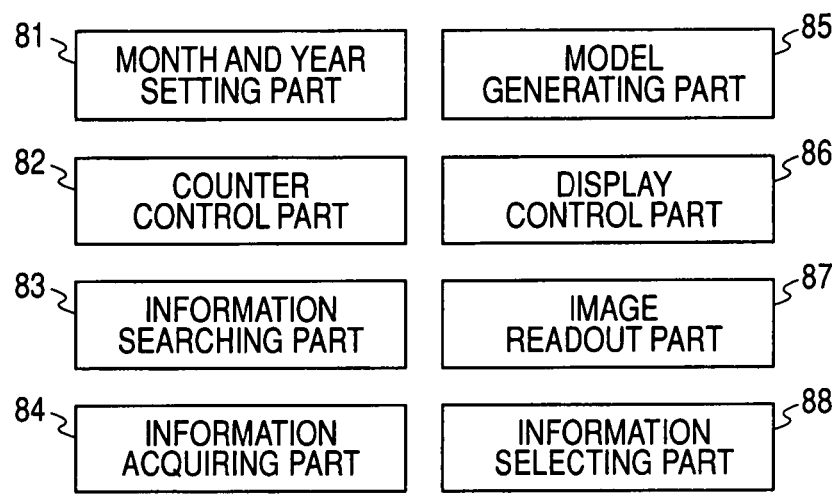
FIG. 2 shows a block diagram depicting an exemplary configuration of functions of the digital camera.

A display control apparatus according to an embodiment of the invention is a display control apparatus which controls display of information about a group of data having a predetermined relevance, the apparatus including: a means for generating a three dimensional model for display in accordance with a first item of information of the information about the group (for example, a model generating part 85 in FIG. 2); and a means for controlling display of a second item of information that is the information about the group and different from the first item of information so as to be overlaid on a three dimensional image displayed based on the model (for example, a display control part 86 in FIG. 2).

The display control apparatus may further include a means for selecting a third item of information that is the information about the group and different from the first item of information and the second item of information in response to a user instruction (for example, an information selecting part 88 in FIG. 2), wherein the generating means may generate the model in accordance with the selected third item of information.

The generating means may generate a subsequent model that displays a three dimensional image in a shape similar to the shape of a three dimensional image displayed based on the model.

Figure 3:
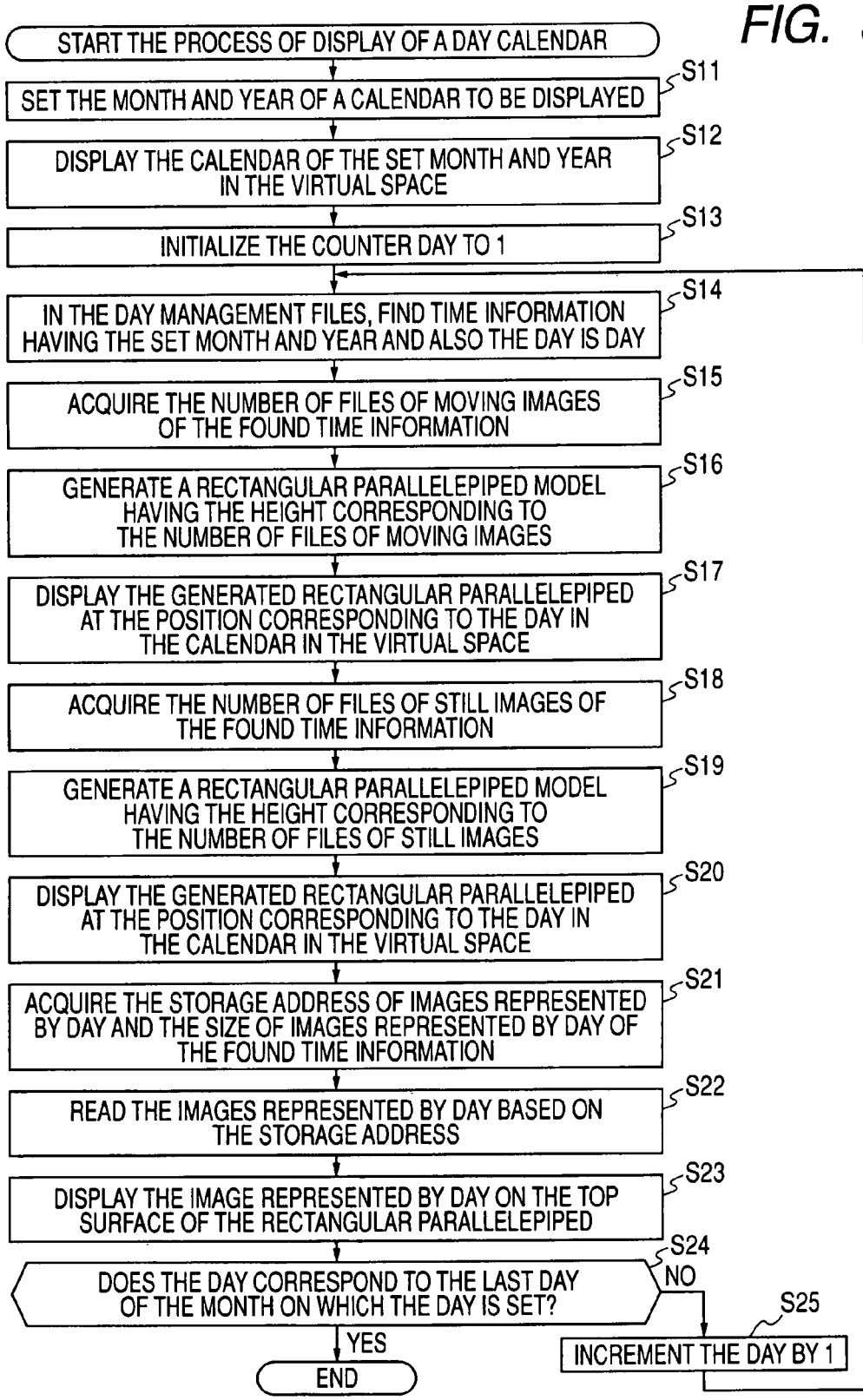
FIG. 3 shows a flow chart depicting exemplary process steps of displaying a day calendar in the digital camera.

The second item of information may be a representative image that represents images displayed in accordance with data belonging to the group, and the display control means may control display of the representative image on a surface of the three dimensional image (for example, Step S23 in FIG. 3).

The second item of information may be information about a ratio between types of data belonging to the group, and the display control means may control display of information about a ratio between types of the data on a surface of the three dimensional image (for example, Step S17 and Step S20 in FIG. 3).

An embodiment of the invention is directed to a display control method of a display control apparatus which controls display of information about a group of data having a predetermined relevance, the method including the steps of: generating a three dimensional model for display in accordance with a first item of information of the information about the group (for example, Step S16 and Step S19 in FIG. 3); and controlling display of a second item of information that is the information about the group and different from the first item of information so as to be overlaid on a three dimensional image displayed based on the model (for example Step S17 and Step S20 in FIG. 3).

An embodiment of the invention is directed to a program which allows a computer to execute a process that controls display of information about a group of data having a predetermined relevance, the program including the steps of: generating a three dimensional model for display in accordance with a first item of information of the information about the group (for example, Step S16 and Step S19 in FIG. 3); and controlling display of a second item of information that is the information about the group and different from the first item of information so as to be overlaid on a three dimensional image displayed based on the model (for example Step S17 and Step S20 in FIG. 3).

Figure 1:
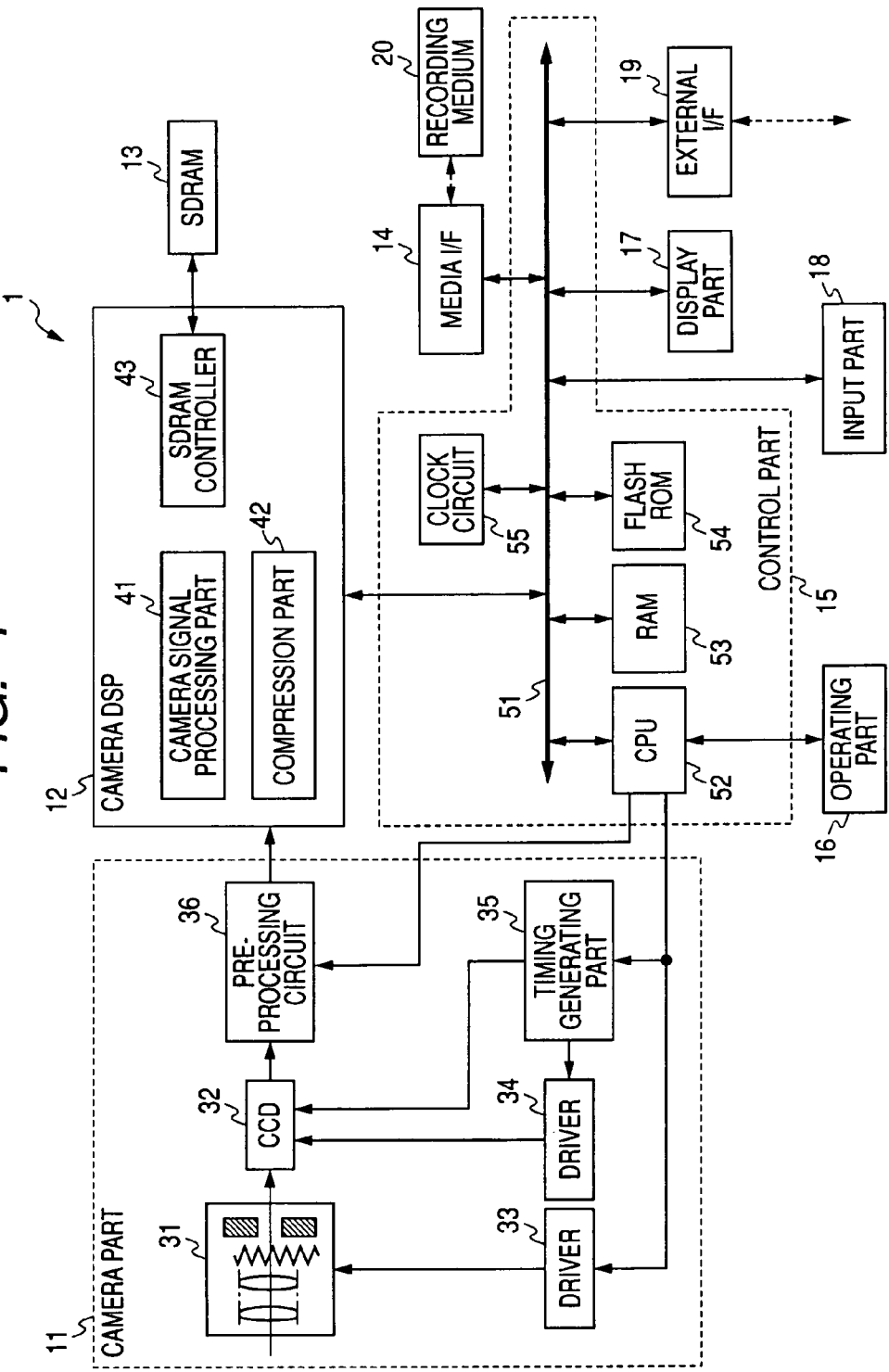
FIG. 1 shows a diagram depicting an exemplary digital camera according to an embodiment of the invention.

FIG. 1 shows an exemplary configuration of a digital camera according to an embodiment of the invention. A digital camera 1 compresses and encodes image data obtained by shooting a subject, and records it on a recording medium 20.

The digital camera 1 is configured of a camera part 11 which generates image data of a subject, a camera DSP (Digital Signal Processor) 12 which applies predetermined processing to image data and compresses and encodes it, and a control part 15 which controls the individual parts of the digital camera 1. Moreover, the digital camera 1 is configured of an SDRAM (Synchronous Dynamic Random Access Memory) 13 which stores compressed and encoded image data (hereinafter, referred to as encoded data) and so on, a media interface 14 which records encoded data on and reads it out of a recording medium 20 (hereinafter, referred to as a media I/F (Interface) 14), an operating part 16 which accepts user operations, a display part 17 which displays an image being taken or a reproduced image thereon, an input part 18 which is disposed as overlaid on the display part 17 and enters user operations, and an external interface 19 which sends and receives encoded data with other electronic appliances such as a personal computer and a video recorder (hereinafter, referred to as an external I/F (Interface) 19).

The camera part 11 is configured of an optical block 31, a CCD (Charge Coupled Device) 32, an optical block driver 33, a CCD driver 34, a timing generating part 35, and a preprocessing circuit 36.

The optical block 31 is configured of a lens group, a focus mechanism, a shutter mechanism, an aperture (iris) mechanism, etc. The optical block 31 operates the focus mechanism, the shutter mechanism, and the aperture mechanism to acquire the light image of the subject, and collects it onto the CCD 32.

The CCD 32 operates in response to a drive signal from the CCD driver 34, receives the light image of the subject collected by the optical block 31, converts the received light image into an image signal as an electric signal through photoelectric conversion, and supplies it to the pre-processing circuit 36 in accordance with the timing signal from a timing generating part 35 controlled by the control part 15.

In addition, for the photoelectric conversion element, a CMOS (Complementary Metal-Oxide Semiconductor) sensor may be disposed, not restricted to the CCD 32.

The optical block driver 33 generates a drive signal to be supplied to the optical block 31 in accordance with control done by the control part 15.

The CCD driver 34 generates a drive signal to be supplied to the CCD 32 based on a timing signal from the timing generating part 35.

The timing generating part 35 generates a timing signal for instructing a predetermined timing in accordance with control done by the control part 15.

The pre-processing circuit 36 applies CDS (Correlated Double Sampling) processing to the image signal supplied from the CCD 32, removes noise to maintain the signal-to-noise ratio well that is the ratio between the signal and noise, as well as performs AGC (Automatic Gain Control) processing to control the gain, and it performs A/D (Analog/Digital) conversion to form image data as digital signal, and outputs it to the camera DSP 12.

The camera DSP 12 is configured of a camera signal processing part 41, a compression part 42, and an SDRAM controller 43.

The camera signal processing part 41 applies camera signal processing such as AF (Auto Focus), AE (Auto Exposure), and AWB (Auto White Balance) to image data inputted from the camera part 11.

For example, the compression part 42 compresses and encodes image data to which camera signal processing is applied in accordance with a predetermined system such as the MPEG (Moving Picture Experts Group) system, and generates encoded data. The generated encoded data is supplied to the media I/F 14 through a system bus 51, described later, and is recorded on the recording medium 20. Alternatively, the generated encoded data may be supplied to the SDRAM controller 43 and recorded on the SDRAM 13, or may be supplied to the external I/F 19 through the system bus 51 and sent to an external computer, for example.

The SDRAM controller 43 records and reproduces encoded data, for example, from the SDRAM 13.

The media I/F 14 records and reproduces encoded data, for example, from the detachable recording medium 20.

The control part 15 is configured of a CPU (Central Processing Unit) 52 which is connected through the system bus 51, a RAM (Random Access Memory) 53, a flash ROM (Read Only Memory) 54, and a clock circuit 55, and controls the individual parts of the digital camera 1 by executing a program held in the flash ROM 54, for example, by means of the CPU 52. The RAM 53 is mainly used as a work area in which the result in midstream of processing is temporarily stored. The flash ROM 54 stores data therein that is necessary for programs and individual processes run in the CPU 52. In addition, the clock circuit 55 clocks the current date and time, which supplies information indicating the current day, month and year, the day of the week, or time, and information indicating the shooting date and time of a still image or a moving image to the CPU 52 through the system bus 51.

The operating part 16 is operated by a user for entering instructions to the digital camera 1, which supplies signals indicating the operation descriptions to the CPU 52. For example, the operating part 16 is configured of various operation buttons, dials, switches, or the receiving part of a remote controller, etc.

For example, the display part 17 is formed of a display device such as an LCD (Liquid Crystal Display) or an organic EL (Electro Luminescence), which displays various images based on display data corresponding to image data supplied from the camera DSP 12 through the control part 15.

For example, the input part 18 is a touch panel that is disposed as overlaid on the display part 17, which detects coordinate information on the portion touched by a user. For example, the detected coordinate information is stored in the RAM 53, and it is referenced when the control part 15 controls display through the display part 17.

For example, the external I/F 19 is connected to an electronic appliance such as a personal computer and a video recorder, which receives the supply of encoded data from the electronic appliance connected thereto, and supplies encoded data recorded on the recording medium 20 to the electronic appliance connected thereto. In addition, it may be possible that a predetermined communication module is connected to the external I/F 19, whereby a communication interface to a network typified by the Internet is added, a cable interface is added such as IEEE (Institute of Electrical and Electronics Engineers) 1394 and USB (Universal Serial Bus), or a radio interface such as IEEE802.11 is added.

The recording medium 20 is a recording medium that is detachably connected to the media I/F 14, for which various media can be used, for example, a hard disk drive, a so-called memory card using a semiconductor memory, an optical recording medium such as a recordable DVD (Digital Versatile Disk) and CD (Compact Disc), and a magnetic disk.

FIG. 2 shows a block diagram depicting an exemplary configuration of functions of the digital camera 1. The functions are implemented by executing a predetermined program by means of the CPU 52 shown in FIG. 1.

As shown in FIG. 2, a month and year setting part 81, a counter control part 82, an information searching part 83, an information acquiring part 84, a model generating part 85, a display control part 86, an image readout part 87, and an information selecting part 88 are implemented by the CPU 52 which runs the program.

For example, the month and year setting part 81 sets the month or year of the calendar to be displayed on the display part 17 based on signals indicating the descriptions of user operations supplied from the operating part 16.

The calendar displayed on the display part 17 is a day calendar or a month calendar. The day calendar is a table that days are arranged in units of days of the specified month and year, which is a so-called calendar. For example, in the case in which July 2006 is specified, a day calendar is a table that days from 1 to 31 are arranged. The month calendar is a table that months are arranged in units of months of the specified year. For example, in the case in which the year 2005 is specified, a month calendar is a table that months from January to December are arranged.

In other words, the month and year setting part 81 sets the month or year of the calendar that specifies the month or year of the calendar to be displayed on the display part 17. For example, data showing the set month or year of the calendar is stored in the RAM 53.

The counter control part 82 initializes and increments various counters inside the control part 15, and manages the value of the counters.

The information searching part 83 retrieves time information from a management file recorded on the recording medium 20. More specifically, from the management file which manages information about still images or moving images recorded on each day on the basis of days, the information searching part 83 retrieves time information on the month and year set by the month and year setting part 81 that the day has the value of the counter. In addition, from the management file which manages information about still images or moving images recorded on each day on the basis of days, the information searching part 83 retrieves time information on the year set by the month and year setting part 81 that the month has the value of the counter.

The management file is a file on which information about still images or moving images for recording is recorded when a still image or a moving image is recorded in the digital camera 1. For example, the management file is recorded on the recording medium 20 on which still images and moving images are recorded. On the management file, the still images or the moving images are recorded, and at the same time, "time information (day, month and year)", "the number of files of still images", "the number of files of moving images", "a storage address of an image represented by day", and "the size of an image represented by day" are read.

The term "time information (day, month and year)" is information that indicates the day, month, and year on which a still image or a moving image is recorded.

The term "the number of files of still images" is the number of files of still images that are recorded on the day indicated by time information.

The term "the number of files of moving images" is the number of files of moving images that are recorded on the day indicated by time information.

The term "the storage address of the image represented by day" is information that indicates the address at which data of an image represented by day is stored that is a scaled down image as an index image representing still images or moving images that are recorded on the day indicated by time information. The term "the storage address of the image represented by day" specifies a predetermined address on the recording medium 20. In other words, data of an image represented by day is recorded on the recording medium 20.

For example, the image represented by day is a scaled down image of a still image first taken on the day indicated by time information. In addition, the image represented by day may be replaced by a scaled down image of a still image desired by the user by editing the management file by the user. Moreover, in the case in which a moving image is desired to be selected as an image represented by day, the beginning frame of data of the moving image may be scald down for an image represented by day.

The term "the size of the image represented by day" is information that indicates the capacity of data of the image represented by day.

As described above, hereinafter, the management file that manages information about still images or moving images recorded on the basis of days is referred to as a the management file for days.

In addition, on the recording medium 20, the management file for days described above is recorded as well as a management file that manages information about the recorded still images or the moving images on the basis of months is recorded. The management file is configured of "time information (month and year)", "a storage address of an image represented by month", and "the size of an image represented by month".

The term "time information (month and year)" is information that indicates the month and year on which a still image or a moving image is recorded.

The term "the storage address of an image represented by month" is information that indicates the address at which scaled down images representing the still images or the moving images recorded on the month indicated by time information are stored, that is, data of the image represented by month is stored that is so-called thumbnail images. The term "the storage address of an image represented by month" specifies a predetermined address on the recording medium 20. In other words, data of the image represented by month is recorded on the recording medium 20. For example, the image represented by month is a scaled down image of a still image first taken on the month indicated by time information. In addition, the image represented by month may be replaced by a scaled down image of a still image desired by the user by editing the management file by the user. Moreover, in the case in which a moving image is desired to be selected as an image represented by month, the beginning frame of data of the moving image may be scald down for an image represented by month.

The term "the size of the image represented by month" is information that indicates the capacity of data of the image represented by month.

As described above, hereinafter, the management file that manages information about the recorded still images or the moving images on the basis of months is referred to as a management file for months.

Returning to the block diagram shown in FIG. 2, the information acquiring part 84 acquires various items of information from the management file based on time information retrieved by the information searching part 83. More specifically, the information acquiring part 84 acquires the number of files of still images or the number of files of moving images on the time information retrieved by the information searching part 83 from the management file for days. In addition, the information acquiring part 84 acquires the storage address of the image represented by day and the size of the image represented by day on the time information retrieved by the information searching part 83 from the management file for days. Moreover, from the management file for months, the information acquiring part 84 acquires the storage address of the image represented by month and the size of the image represented by month on the time information on the year set by the month and year setting part 81 that the month is the value of the counter in the management file for months.

In addition, the information acquiring part 84 acquires information about a folder indicated by operating the operating part 16 by a user.

The model generating part 85 generates a three dimensional model for display in accordance with information about a group. For example, the model generating part 85 generates a model that displays a three dimensional rectangular parallelepiped having the height corresponding to information about a group for each group.

Here, the term "the group" is a collection of items of data to which the same metadata is added, such as a group of still images or moving images taken on the same day and a group of still images or moving images taken on the same month, or a collection of items of data that is searched under a single condition such as a group of data stored in the same folder.

For example, the model generated by the model generating part 85 is a solid model of CAD (Computer-Aided Design) or an X3D (Extensible 3D: Extensible three dimensional markup) model and so on, and is data that expresses a shape in a three dimensional space in numeric values.

More specifically, the model generating part 85 generates a model that displays a three dimensional rectangular parallelepiped having the height corresponding to the number of files of still images or the number of files of moving images recorded on each day on which images are taken. The model generating part 85 generates a model that displays a three dimensional rectangular parallelepiped having the height corresponding to the number of files of still images or the number of files of moving images recorded on the basis of months on which images are taken.

In addition, the model generating part 85 generates a model of a rectangular parallelepiped having the height corresponding to information about a folder for each folder in which data is recorded. Moreover, the model generating part 85 generates a model of a rectangular parallelepiped having the height corresponding to information about a folder displayed on the front surface among the side surfaces of the rectangular parallelepiped.

The display control part 86 controls display of the display part 17. For example, the display control part 86 generates display data for image display based on image data supplied from the camera part 11, and supplies it to the display part 17, whereby it displays various images on the display part 17.

The display control part 86 displays a day calendar in which the month and year are set in the virtual space displayed on the display part 17. In addition, the display control part 86 displays a month calendar in which the year is set in the virtual space displayed on the display part 17.

The display control part 86 displays information that is information about a group and different from information for the basis of a three dimensional model as the information is overlaid on a three dimensional image to be displayed based on the three dimensional model. More specifically, the three dimensional image to be displayed based on the three dimensional model has surfaces. For example, the display control part 86 displays other information about a group different from information that is the bases of the height of the rectangular parallelepiped on the surface of the rectangular parallelepiped generated for each group.

The display control part 86 displays a rectangular parallelepiped by a model generated for each day by the model generating part 85 at the position corresponding to a predetermined day on the calendar displayed on the virtual space. The display control part 86 displays a rectangular parallelepiped by a model generated for each month by the model generating part 85 at the position corresponding to a predetermined month on the calendar displayed on the virtual space.

The display control part 86 displays information about a group of images taken on a predetermined day as the information is overlaid on a rectangular parallelepiped displayed for each day. For further detail, the display control part 86 displays the ratio between the number of files of moving images and the number of files of still images for days on the side surface of the rectangular parallelepiped displayed for each day as well as displays the image represented by day read out by the image readout part 87, described later, on the top surface of the rectangular parallelepiped displayed for each day. In addition, the display control part 86 displays information about a group of images taken on a predetermined month as the information is overlaid on the rectangular parallelepiped displayed for each month. For further detail, the display control part 86 displays the ratio between the number of files of moving images and the number of files of still images for months on the side surface of the rectangular parallelepiped displayed for each month as well as displays the image represented by month read out by the image readout part 87 on the top surface of the rectangular parallelepiped displayed for each month.

The display control part 86 displays information about a predetermined folder in which data is recorded as the information is overlaid on the rectangular parallelepiped displayed for each folder. For further detail, the display control part 86 displays two or more items of information about the folder on the side surfaces of the rectangular parallelepiped displayed by a model generated for each folder in which data is recorded. In addition, the display control part 86 controls display of information displayed on the front surface among the side surfaces of the rectangular parallelepiped as well as controls display of other items of information on the other side surfaces adjacent to the front surface. Moreover, the display control part 86 displays a representative image that represents images displayed by image data recorded in the folder on the top surface of the rectangular parallelepiped.

The image readout part 87 reads an image represented by day based on the storage address of the image represented by day acquired by the information acquiring part 84. In addition, the image readout part 87 reads an image represented by month based on the storage address of the image represented by month acquired by the information acquiring part 84.

The information selecting part 88 selects one of items of information of the information acquired by the information acquiring part 84 in accordance with user instructions.

Hereinafter, the display process in the digital camera 1 will be described.

FIG. 3 shows a flow chart depicting exemplary process steps of displaying a day calendar in the digital camera 1.

For example, the digital camera 1 starts the process by operating the operating part 16 to acquire the signal indicating the start of the display process of a day calendar by the control part 15.

In Step S11, the month and year setting part 81 sets the month and year of a calendar to be displayed on the display part 17 based on the signal indicating the descriptions of user operations supplied from the operating part 16. The signal indicating the descriptions of user operations may be supplied from the input part 18. For example, the month and year setting part 81 sets April 2005.

In Step S12, the display control part 86 displays the calendar on the set month and year in the virtual space displayed on the display part 17. For example, the display part 17 displays the calendar table of April 2005, that is, the calendar of April 2005 on one plane in the virtual space. In Step S12, on the calendar in a plane displayed on the display part 17 by the display control part 86, a rectangular space of a predetermined area is arranged for each day.

In Step S13, the counter control part 82 initializes a counter DAY expressing a day to 1. Hereinafter, the counter value of the counter DAY is simply denoted as a variable DAY.

In Step S14, the information searching part 83 searches the management file for days for time information indicating the date identified by the set month and year and the variable DAY. In other words, for example, the information searching part 83 searches the management file for days for time information that is 1 Apr., 2005.

FIG. 4 shows a diagram depicting an exemplary management file for days. The management file for days is recorded with time information that indicates the taken date, the number of files of still images that indicates the number of files of still images taken on the day indicated by time information, the number of files of moving images that indicates the number of files of moving images taken on the day indicated by time information, the storage destination address of the image represented by day that is representative of images taken on the day indicated by time information (hereinafter, referred to as a storage address), and the size of the image represented by day.

In the example shown in FIG. 4, items of information about still images and moving images taken on 1 Apr., 2005, 2 Apr., 2005 . . . and 5 May, 2006 are recorded. More specifically, as corresponding to time information "2005.04.01" indicating 1 Apr., 2005, the following is recorded: the number of files of still images is 13, the number of files of moving images is 7, the storage address of the image represented by day is 0x00002345 indicating an address, and the size of the image represented by day is "1234" indicating 1234 bytes. In addition, as corresponding to time information "2005.04.02" indicating 2 Apr., 2005, the following is recorded: the number of files of still images is 23, the number of files of moving images is 11, the storage address of the image represented by day is 0x00001234 indicating an address, and the size of the image represented by day is "3456" indicating 3456 bytes. Moreover, as corresponding to time information "2006.05.05" indicating 5 May, 2006, the following is recorded: the number of files of still images is 32, the number of files of moving images is 22, the storage address of the image represented by day is 0x00054321 indicating an address, and the size of the image represented by day is "4567" indicating 4567 bytes.

In Step S15, the information acquiring part 84 acquires the number of files of moving images on the time information searched from the management file for days. In other words, for example, the information acquiring part 84 acquires the number of files of moving images "7" corresponding to time information "2005.04.01" in the management file for days shown in FIG. 4.

In Step S16, the model generating part 85 generates a model of a rectangular parallelepiped having the height corresponding to the number of files of moving images. More specifically, for example, the model generating part 85 generates the models of the rectangular parallelepipeds having the height corresponding to the acquired number of files of moving images "7".

For more detailed description, the model generating part 85 stores in advance the basic data having the height corresponding to the number of files being one, and multiplies the number of files of moving images acquired in Step S15 by the criterion of height to decide the height of the rectangular parallelepiped. In addition, the model generating part 85 decides the shapes of the top surface and the bottom surface of the rectangular parallelepiped as matched with the shape of a rectangular area for each day on the calendar displayed in Step S12. Then, as described above, the model generating part 85 generates the model that expresses the rectangular parallelepiped having the height and the shape of the top surface and the bottom surface defined by numeric values.

In addition, the criterion for the height corresponding to the number of files being one may be changed in accordance with the maximum number of files between the number of files of moving images and the number of files of still images used when a single screen of a calendar is displayed. In other words, in the case in which the maximum number of files is large, the criterion for the height corresponding to the number of files being one is made small, whereas in the case in which the maximum number of files is small, the criterion for the height corresponding to the number of files being one is made greater, whereby such events can be avoided that the rectangular parallelepiped to be displayed is extended off the screen of the display part 17 and that the rectangular parallelepiped is too short depending on models, and the rectangular parallelepiped to be displayed can be in an adequate size depending on models.

In Step S17, the display control part 86 displays the rectangular parallelepiped having the height corresponding to the generated number of files of moving images at the position corresponding to the variable DAY on the calendar in the virtual space displayed on the display part 17 by the model generated in Step S16, that is, in the region of the date indicated by the variable DAY. More specifically, for example, the display control part 86 displays the rectangular parallelepiped having the height corresponding to the number of files of moving images "7" at the position of 1 Apr., 2005 on the calendar April 2005 displayed on the display part 17. In addition, the side surfaces of the rectangular parallelepiped to be displayed, that is, the color of four surfaces in parallel in the height direction is a predetermined color, blue, for example.

In Step S18, the information acquiring part 84 acquires the number of files of still images on the time information retrieved from the management file for days. In other words, for example, the information acquiring part 84 acquires the number of files of still images "11" corresponding to the time information "2005.04.01" from the management file for days shown in FIG. 4.

In Step S19, the model generating part 85 generates a model of a rectangular parallelepiped having the height corresponding to the number of files of still images by the process similar to that in Step S16. More specifically, for example, the model generating part 85 generates the model of the rectangular parallelepiped having the height corresponding to the acquired number of files of still images "11".

In Step S20, the display control part 86 displays the rectangular parallelepiped having the height corresponding to the number of files of generated still images on the rectangular parallelepiped having the height corresponding to the number of files of moving images displayed at the position corresponding to the variable DAY on the calendar in the virtual space displayed on the display part 17 by the model generated in Step S19. More specifically, for example, the display control part 86 displays the rectangular parallelepiped having the height corresponding to the number of files of generated still images "11" and having the bottom surface in the same shape as that of the top surface of the rectangular parallelepiped having the height corresponding to the number of files of moving images "7", on the rectangular parallelepiped having the height corresponding to the number of files of moving images "7" displayed at the position of 1 Apr., 2005 on the calendar April 2005 displayed on the display part 17.

In addition, the side surfaces of the rectangular parallelepiped having the height corresponding to the number of files of still images, that is, the color of four surfaces in parallel in the height direction is a predetermined color, gray, for example. In addition, the color of the side surfaces of the rectangular parallelepiped having the height corresponding to the number of files of still images is not restricted to gray, which may be any color as long as it can be distinguished from blue that is the color of the side surfaces of the rectangular parallelepiped having the height corresponding to the number of files of moving images.

As described above, at the position of 1 Apr., 2005 on the calendar April 2005 displayed on the display part 17, the rectangular parallelepiped having the height corresponding to "18" is displayed that is the sum of the number of files of moving images "7" and the number of files of still images "11". In addition, the side surfaces of the rectangular parallelepiped having the height corresponding to the number of files "18" is to be split into blue and gray in the height direction at the ratio of 7:11.

In Step S21, the information acquiring part 84 acquires the storage address of the image represented by day and the size of the image represented by day on the retrieved time information from the management file for days. In other words, in the management file for days shown in FIG. 4, the information acquiring part 84 acquires the storage address of the image represented by day "0x00002345" corresponding to time information "2005.04.01", and the size of the image represented by day "1234".

In Step S22, the image readout part 87 reads data of the image represented by day out of the recording medium 20 based on the storage address of the acquired image represented by day.

In Step S23, the display control part 86 displays the image represented by day on the top surface of the rectangular parallelepiped displayed. In other words, the display control part 86 displays the image represented by day based on data of the image represented by day stored at the address "0x002345" on the top surface of the upper rectangular parallelepiped between two rectangular parallelepipeds displayed at the position 1 Apr., 2005 on the calendar April 2005 displayed on the display part 17.

As described above, on the rectangular parallelepiped displayed at the position 1 Apr., 2005, the image represented by day on 1 Apr., 2005 is displayed.

In Step S24, the counter control part 82 determines whether the variable DAY is the value corresponding to the last day in the set month. The value corresponding to the last day of the month is "31", when the set month is January, March, May, July, August, October, or December, whereas it is "30" when the set month is April, June, September, or November. In addition, in the case in which the set month is February of a leap year, the value corresponding to the last day of the month is "29", whereas in the case in which the set month is February other than a leap year, the value corresponding to the last day of the month is "28".

In Step S24, if it is determined that the variable DAY is not the value corresponding to the last day on the set month, the process goes to Step S25.

In Step S25, the counter control part 82 increments the variable DAY by one, the process returns to Step S14, and the process steps described above are repeated for the subsequent day indicated by the variable DAY.

On the other hand, in Step S24, if it is determined that the variable DAY is the value corresponding to the last day on the set month, that is, when the rectangular parallelepipeds are displayed for all the days on the calendar displayed on the display part 17, the process is ended.

Figure 5:
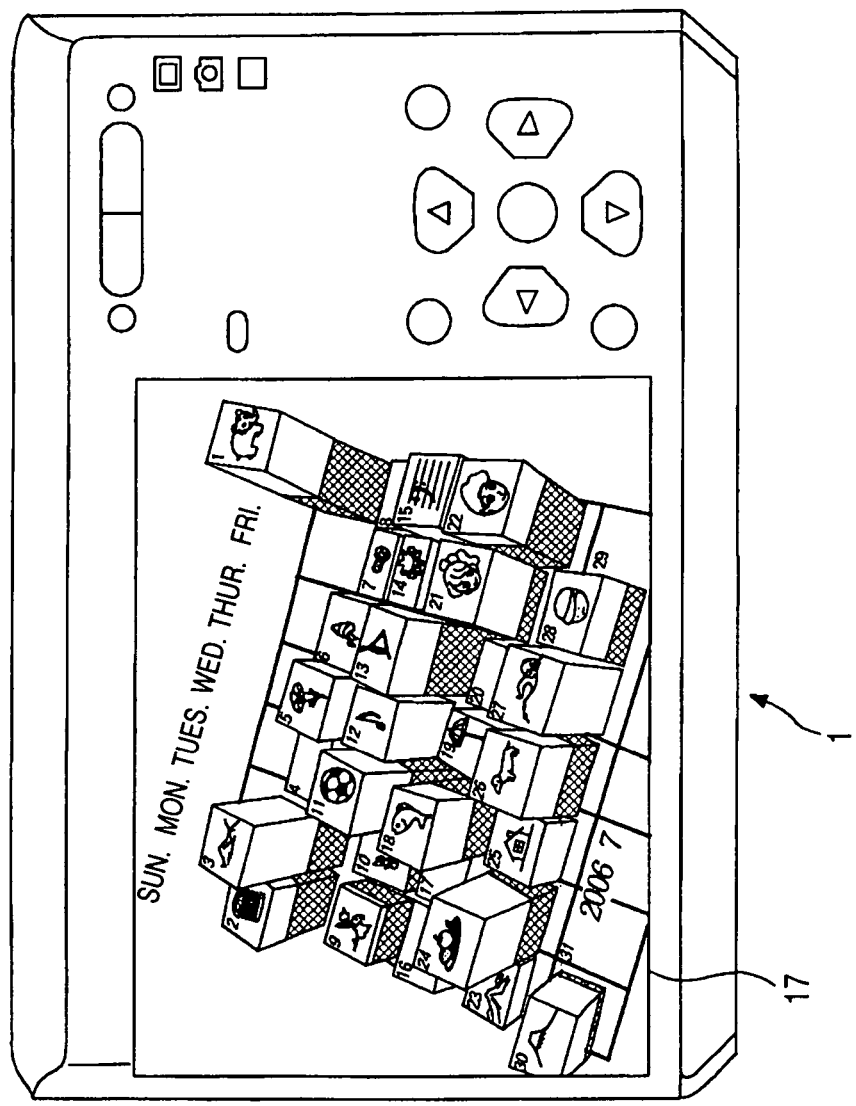
FIG. 5 shows a diagram illustrative of an exemplary display of an index screen.

With this scheme, for example, the index screen as shown in FIG. 5 can be displayed. In FIG. 5, the number of files of the moving images and the number of files of still images recorded on 1st to 31 Jul., 2006 are displayed in accordance with the height of the rectangular parallelepiped and the color coding of the side surfaces displayed on the respective days from 1st to 31st on the calendar. In addition, on the top surface of the individual rectangular parallelepipeds, the image represented by day is displayed as the index image among the still images or the moving images recorded on the individual days from 1st to 31 Jul., 2006.

Accordingly, the number of files of moving images and the number of files of still images can be displayed three dimensionally in accordance with the height of the rectangular parallelepiped for each of the shooting days, and thus the amount of images for each of the shooting days can be quickly, easily grasped.

In addition, in the discussion described above, the rectangular parallelepiped having the height corresponding to the number of files of still images is displayed on the rectangular parallelepiped having the height corresponding to the number of files of moving images. However, turning upside down, the rectangular parallelepiped having the height corresponding to the number of files of moving images may be displayed on the rectangular parallelepiped having the height corresponding to the number of files of still images.

Figure 6:
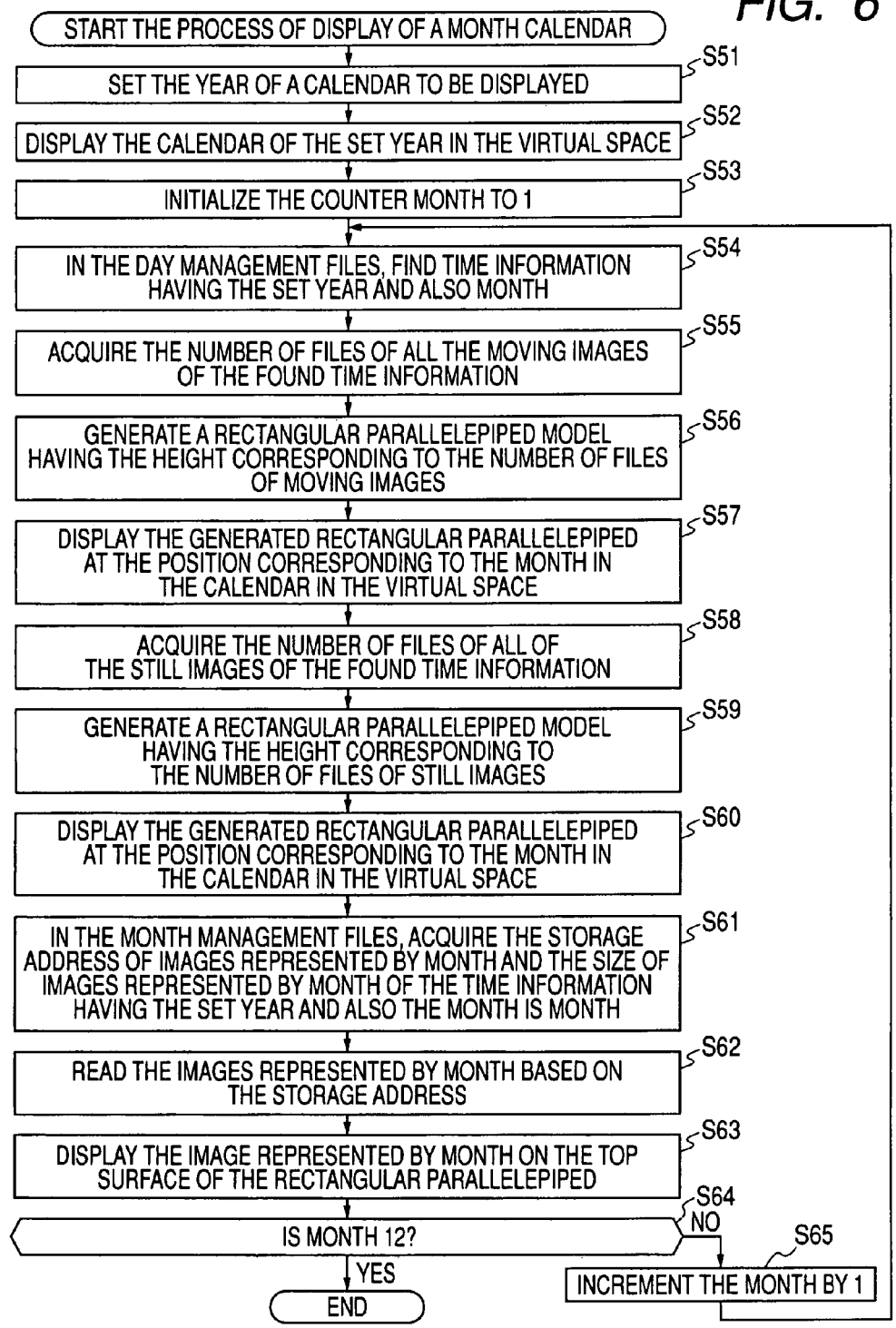
FIG. 6 shows a flow chart depicting exemplary process steps of displaying a month calendar in the digital camera.

FIG. 6 shows a flow chart depicting exemplary process steps of displaying a month calendar in the digital camera 1.

For example, the digital camera 1 starts the process by operating the operating part 16 to acquire the signal indicating the start of the display process of a month calendar by the control part 15.

In Step S51, the month and year setting part 81 sets the year of the calendar displayed on the display part 17 based on the signal indicating the descriptions of user operations supplied from the operating part 16. The signal indicating the descriptions of user operations may be supplied from the input part 18. For example, the month and year setting part 81 sets the year 2005.

In Step S52, the display control part 86 displays the calendar in the set year in the virtual space displayed on the display part 17. For example, the display part 17 displays the calendar of the year 2005 on one plane in the virtual space. In Step S52, on the year calendar displayed on the display part 17 by the display control part 86, a rectangular space of a predetermined area is arranged for each month.

In Step S53, the counter control part 82 initializes a counter MONTH indicting the month to one. Hereinafter, the counter value of the counter MONTH is simply denoted by a variable MONTH.

In Step S54, the information searching part 83 searches the management file for days for time information indicting the set year and the month identified by the variable MONTH. In other words, for example, the information searching part 83 searches the management file for days for time information in January 2005.

In Step S55, from the management file for days, the information acquiring part 84 acquires the number of files of all the moving images on the retrieved time information. In other words, for example, from the management file for days, the information acquiring part 84 acquires the numbers of files of moving images on time information "2005.01.01" indicating 1 Jan., 2005 to time information "2005.01.31" indicating 31 Jan., 2005.

In Step S56, the model generating part 85 generates a model of a rectangular parallelepiped having the height corresponding to the number of files of moving images. More specifically, for example, the model generating part 85 generates a model of a rectangular parallelepiped having the height corresponding to the sum of the acquired numbers of files of moving images.

For more detailed description, the model generating part 85 stores in advance the basic data having the height corresponding to the number of files being one, and multiplies the acquired number of files of moving images by the criterion of height in Step S55, whereby it decides the height of the rectangular parallelepiped. In addition, the model generating part 85 decides the shapes of the top surface and the bottom surface of the rectangular parallelepiped as matched with the shape of a rectangular area for each month on the year calendar displayed in Step S52. Then, as described above, the model generating part 85 generates a model that expresses a rectangular parallelepiped having the shapes of the height, the top surface, and the bottom surface defined by numeric values.

In Step S57, the display control part 86 displays the rectangular parallelepiped having the height corresponding to the number of files of generated moving images at the position corresponding to the variable MONTH on the calendar in the virtual space displayed on the display part 17, that is, in the region of the month indicated by the variable MONTH by the model generated in Step S56. More specifically, for example, the display control part 86 displays the rectangular parallelepiped having the height corresponding to the number of files of moving images at the position January 2005 on the calendar of the year 2005 displayed on the display part 17. In addition, the side surfaces of the rectangular parallelepiped to be displayed, that is, the color of four surfaces in parallel in the height direction is a predetermined color, blue, for example.

In Step S58, from the management file for days, the information acquiring part 84 acquires the number of files of still images on the retrieved time information. In other words, for example, from the management file for days, the information acquiring part 84 acquires the numbers of files of still images on time information "2005.01.01" to time information "2005.01.31".

In Step S59, by the process similar to that in Step S56, the model generating part 85 generates a model of a rectangular parallelepiped having the height corresponding to the number of files of still images. More specifically, for example, the model generating part 85 generates a model of a rectangular parallelepiped having the height corresponding to the sum of the acquired numbers of files of still images.

In Step S60, the display control part 86 displays the rectangular parallelepiped having the height corresponding to the number of files of generated still images on the rectangular parallelepiped having the height corresponding to the number of files of moving images displayed at the position corresponding to the variable MONTH on the calendar in the virtual space displayed on the display part 17 by the model generated in Step S59. More specifically, for example, the display control part 86 displays the rectangular parallelepiped having the height corresponding to the number of files of generated still images having the bottom surface in the same shape as the top surface of the rectangular parallelepiped having the height corresponding to the number of files of moving images, on the rectangular parallelepiped having the height corresponding to the number of files of moving images displayed at the position January 2005 on the calendar of the year 2005 displayed on the display part 17.

In addition, the side surfaces of the rectangular parallelepiped having the height corresponding to the number of files of still images, that is, the color of four surfaces in parallel in the height direction is a predetermined color, gray, for example. In addition, the color of the side surfaces of the rectangular parallelepiped having the height corresponding to the number of files of still images is not restricted to gray, which may be any color as long as it can be distinguished from blue that is the color of the side surfaces of the rectangular parallelepiped having the height corresponding to the number of files of moving images.

As described above, at the position January 2005 on the calendar of the year 2005 displayed on the display part 17, a rectangular parallelepiped having the height corresponding to the sum of the number of files of moving images and the number of files of still images recorded in January 2005 is displayed. In addition, the side surfaces of the rectangular parallelepiped having the height corresponding to the sum of the numbers of files are separated into blue and gray at the ratio corresponding to the number of files of moving images and the number of files of still images in the height direction.

In Step S61, from the management file for months, the information acquiring part 84 acquires the storage address of the image represented by month and the size of the image represented by month on time information in the set year that the month is MONTH.

FIG. 7 shows a diagram depicting an exemplary management file for months. The management file for months is recorded with time information that indicates the shooting month, a destination storage address of an image represented by month that represents images taken in the month indicated by time information, and the size of the image represented by month.

In the example shown in FIG. 7, items of information about still images and moving images taken in January 2005, April 2005, . . . and May 2006 are recorded, respectively. More specifically, as corresponding to time information "2005.01" indicating January 2005, recorded are: the storage address of the image represented by month that indicates address 0x00000321 and the size of "987" of the image represented by month that indicates 987 bytes. In addition, as corresponding to time information "2005.04" indicating April 2005, recorded are: the storage address of the image represented by month that indicates address 0x00002345, and the size of "1234" of the image represented by month that indicates 1234 bytes. Moreover, as corresponding to time information "2006.05" that indicates May 2006, recorded are: the storage address of the image represented by month that indicates address 0x00054321, and the size of "4567" of the image represented by month that indicates 4567 bytes.

In other words, in Step S61, for example, from the management file for months shown in FIG. 7, the information acquiring part 84 acquires the storage address "0x00000321" of the image represented by month that corresponds to time information "2005.01", and the size of "987" of the image represented by month.

In Step S62, the image readout part 87 reads data of the image represented by month out of the recording medium 20 based on the storage address of the acquired image represented by month.

In Step S63, the display control part 86 displays the image represented by day on the top surface of the rectangular parallelepiped displayed. In other words, the display control part 86 displays the image represented by month based on data of the image represented by month stored at the address "0x00000321" on the top surface of the upper rectangular parallelepiped between two rectangular parallelepipeds displayed at the position January 2005 on the calendar of the year 2005 displayed on the display part 17.

As described above, on the rectangular parallelepiped displayed at the position January 2005, the image represented by month in January 2005 is displayed.

In Step S64, the counter control part 82 determines whether the variable MONTH is 12. In Step S64, if it is determined that the variable MONTH is not 12, the process goes to Step S65.

In Step S65, the counter control part 82 increments the variable MONTH by one. The process returns to Step S54, and the process steps described above are repeated for the subsequent month indicated by the variable MONTH.

On the other hand, in Step S64, if it is determined that the variable MONTH is 12, that is, when rectangular parallelepipeds are displayed for all the months of the calendar displayed on the display part 17, the process is ended.

Figure 8:
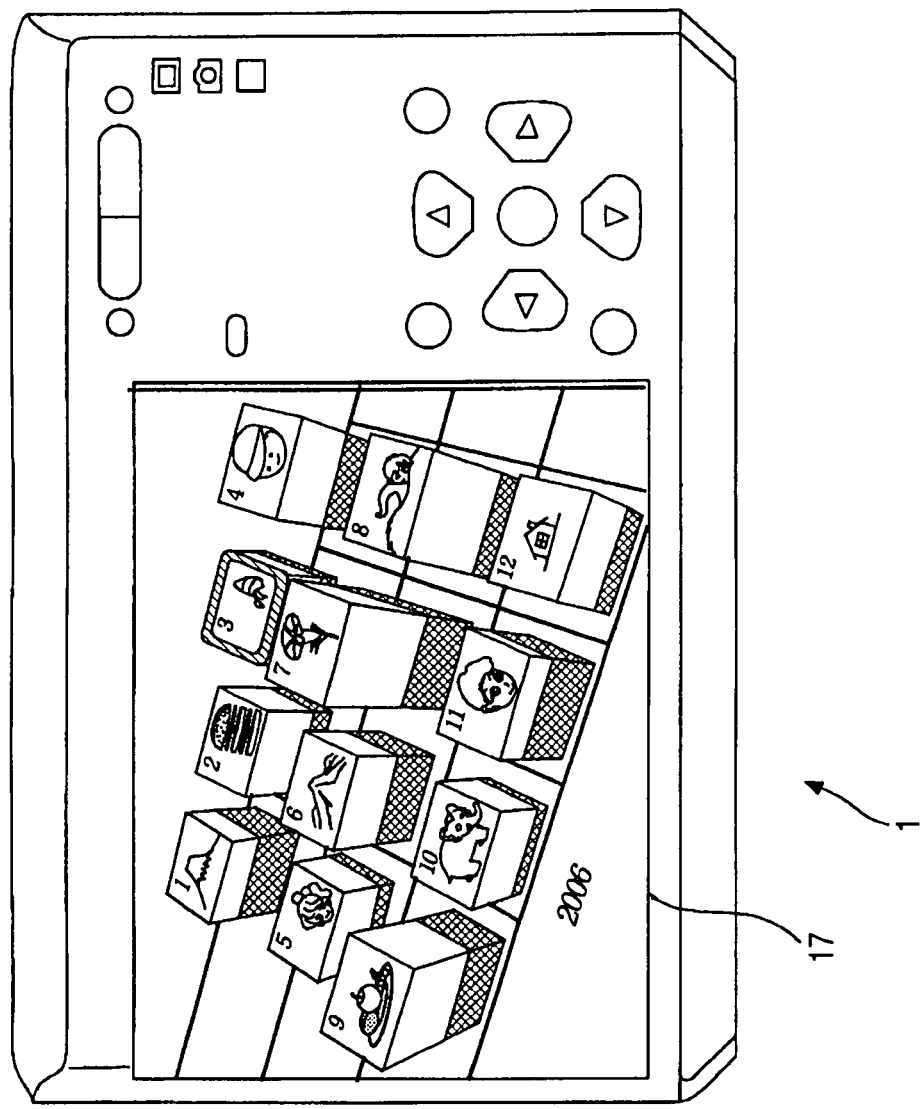
FIG. 8 shows a diagram illustrative of another exemplary display of an index screen.

With this scheme, for example, an index screen as shown in FIG. 8 can be displayed. In FIG. 8, the number of files of moving images and the number of files of still images recorded in January to December 2006 are displayed in January to December on the calendar by the height of the rectangular parallelepiped and the color coding of the side surfaces. In addition, on the respective top surfaces of the rectangular parallelepipeds, the image represented by month is displayed as an index image among still images or moving images recorded in January to December 2006.

With this configuration, since the number of files of moving images and the number of files of still images are three dimensionally displayed by the height of the rectangular parallelepiped for every shooting month, the amount of taken images can be quickly, easily grasped on the basis of months.

As described above, in displaying the index images, the digital camera 1 can display more clearly the number of taken images on the basis of days and the number of taken images on the basis of months.

In addition, in the discussion described above, the rectangular parallelepiped having the height corresponding to the number of files of still images is displayed on the rectangular parallelepiped having the height corresponding to the number of files of moving images. However, turning upside down, the rectangular parallelepiped having the height corresponding to the number of files of moving images may be displayed on the rectangular parallelepiped having the height corresponding to the number of files of still images.

Figure 9:
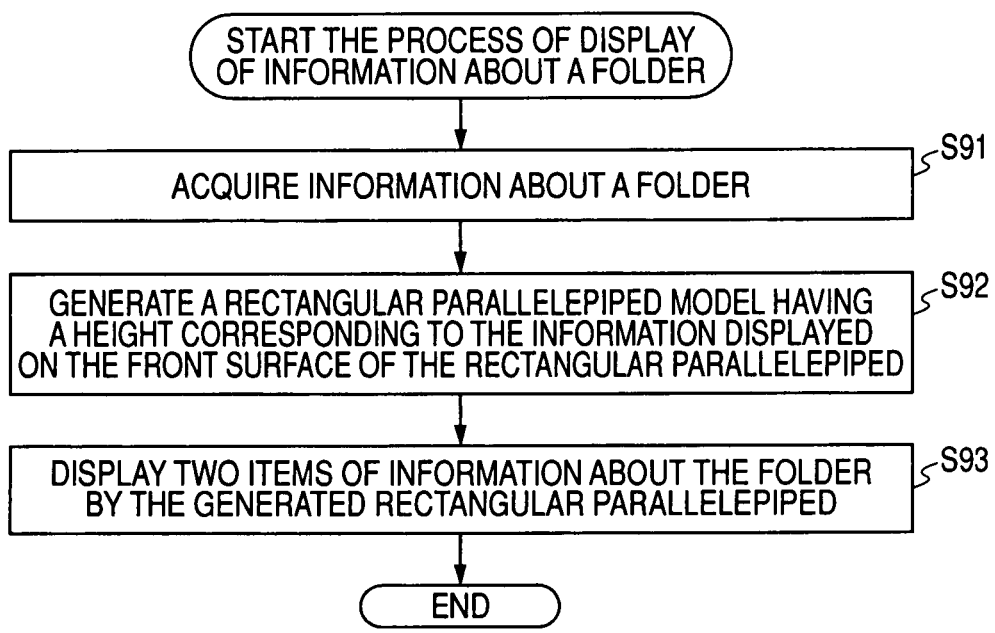
FIG. 9 shows a flow chart depicting exemplary process steps of displaying information about a folder in the digital camera.

FIG. 9 shows a flow chart depicting exemplary process steps of displaying the information about a folder in the digital camera 1.

For example, the digital camera 1 starts the process by operating the operating part 16 to acquire the signal indicating the start of the display process of information about a predetermined folder on the recording medium 20 by the control part 15.

Step S91, the information acquiring part 84 acquires information about a folder instructed by operating the operating part 16 by a user. For example, from the folder instructed, the information acquiring part 84 acquires the number of contents recorded in the folder, the file capacity that is the data volume of the contents recorded in the folder, and the recording time of the contents recorded in the folder.

In Step S92, the model generating part 85 generates a model of a three dimensional rectangular parallelepiped having the height corresponding to information displayed on the front surface of the side surfaces of the rectangular parallelepiped, the information being about the acquired folder. For example, the model generating part 85 generates a model of a rectangular parallelepiped having the height corresponding to the number of contents recorded in the folder.

In Step S93, the display control part 86 displays two items of information about the folder by the rectangular parallelepiped generated by the model generating part 85 on the display part 17, and the process is ended. More specifically, for example, the display control part 86 displays the number of contents recorded in the folder on the front surface of the side surfaces of the rectangular parallelepiped having the height corresponding to the number of contents recorded in the folder, as well as displays the file capacity of the contents recorded in the folder on the right surface, for example, adjacent to the front surface.

Figure 10:
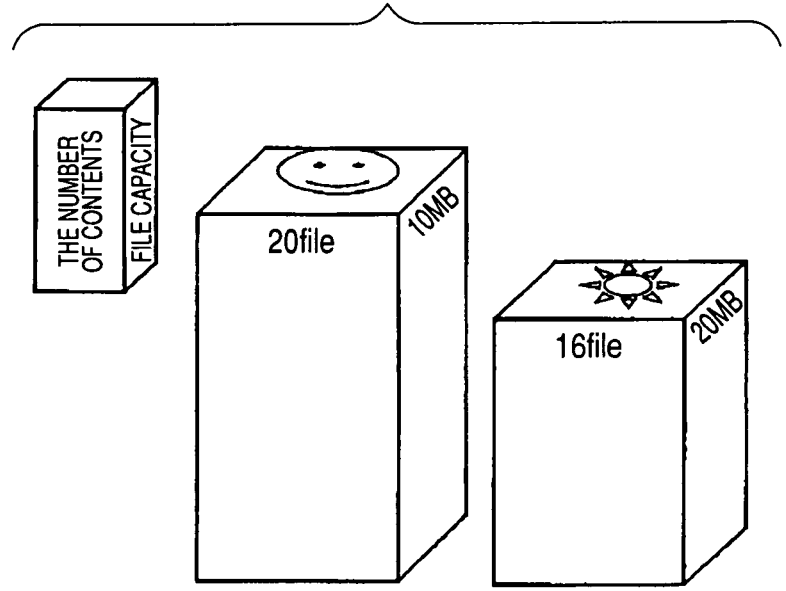
FIG. 10 shows a diagram illustrative of exemplary rectangular parallelepipeds which display information about folders.

FIG. 10 shows a diagram illustrative of, exemplary rectangular parallelepipeds that a model is generated by the model generating part 85 and information about a folder is displayed by the display control part 86.

In FIG. 10, two rectangular parallelepipeds at the center correspond to two folders among folders on the recording medium 20 of the digital camera 1, each indicating its information about the folder. In addition, the rectangular parallelepiped upper left is a rectangular parallelepiped for describing information displayed on the side surfaces of the two rectangular parallelepipeds at the center.

In other words, in FIG. 10, among the side surfaces of the rectangular parallelepiped upper left, "the number of contents" is displayed on the front surface, and "the file capacity" is displayed on the right surface adjacent to the front surface. Thus, the number of contents recorded in the folder corresponding thereto is displayed on the front surface of each of the two rectangular parallelepipeds at the center, and the file capacity that is the data volume of the contents recorded in the folder corresponding thereto is displayed on the right surface of the front surface of each of the two rectangular parallelepipeds at the center. In addition, the representative image displayed by image data that is data of images recorded in the folder corresponding thereto is displayed on the top surface of each of the two rectangular parallelepipeds at the center.

For example, from the folder corresponding to the rectangular parallelepiped shown in the left of the two rectangular parallelepipeds at the center shown in FIG. 10, the information acquiring part 84 acquires the number of contents "20 files" that indicates the number of contents being 20, the file capacity "10 MB" that indicates 10 Mbytes, and the recording time "1.5 h" that indicates 1.5 hours.

The model generating part 85 generates a model of a rectangular parallelepiped having the height corresponding to information displayed on the front surface among the acquired "20 files", "10 MB", and "1.5 h". In other words, the model generating part 85 generates a model of a rectangular parallelepiped having the height corresponding to the number of contents "20 files" displayed on the front surface of the rectangular parallelepiped as the rectangular parallelepiped shown on the left of the two rectangular parallelepipeds at the center shown in FIG. 10.

The display control part 86 displays the number of contents "20 files" on the front surface of the side surfaces of the generated rectangular parallelepiped as well as displays the file capacity "10 MB" on the right surface adjacent to the front surface. In addition, the display control part 86 displays an image "smile" that is the representative image of images displayed in accordance with the image data recorded in the folder on the top surface of the rectangular parallelepiped.

In addition, for example, from the folder corresponding to the rectangular parallelepiped shown on the right of the two rectangular parallelepipeds at the center shown in FIG. 10, the information acquiring part 84 acquires the number of contents "16 files" that indicates the number of contents being 16, the file capacity "20 MB" that indicates 20 Mbytes, and the recording time "2.8 h" that indicates 2.8 hours.

The model generating part 85 generates a model of a rectangular parallelepiped having the height corresponding to information displayed on the front surface of the rectangular parallelepiped among acquired information "16 files", "20 MB", and "2.8 h". In other words, the model generating part 85 generates a model of a rectangular parallelepiped having the height corresponding to the number of contents "16 files" displayed on the front surface of the rectangular parallelepiped as the rectangular parallelepiped shown on the right of the two rectangular parallelepipeds at the center shown in FIG. 10.

The display control part 86 displays the number of contents "16 files" on the front surface of the side surfaces of the generated rectangular parallelepiped as well as displays the file capacity "20 MB" on the right surface adjacent to the front surface. In addition, the display control part 86 displays an image "sun" that is the representative image of images displayed in accordance with the image data recorded in the folder on the top surface of the rectangular parallelepiped.

As described above, the digital camera 1 generates a model of a rectangular parallelepiped having the height corresponding to the number of contents in the folder corresponding to each of the rectangular parallelepipeds, and displays the representative image of images displayed in accordance with the number of contents recorded in each of the folders, the file capacity of the contents recorded in each of the folders, and the image data recorded in each of the folders by the generated rectangular parallelepipeds.

Here, for example, the rectangular parallelepipeds shown in FIG. 10 may be displayed as the orientations are changed on the display part 17.

For example, when a user operates the operating part 16 and "the file capacity" is clicked that is displayed on the right surface adjacent to the front surface of the side surfaces of the rectangular parallelepiped upper left in FIG. 10, the digital camera 1 rotates each of the rectangular parallelepipeds leftward at an angle of 90 degrees about the axis of the height direction so that the file capacity displayed on the right surface of the two rectangular parallelepipeds shown in FIG. 10 is turned to the front surface, that is, to the surface on which the number of contents is displayed, as well as it displays the rectangular parallelepiped having the height corresponding to the file capacity.

Figure 11:
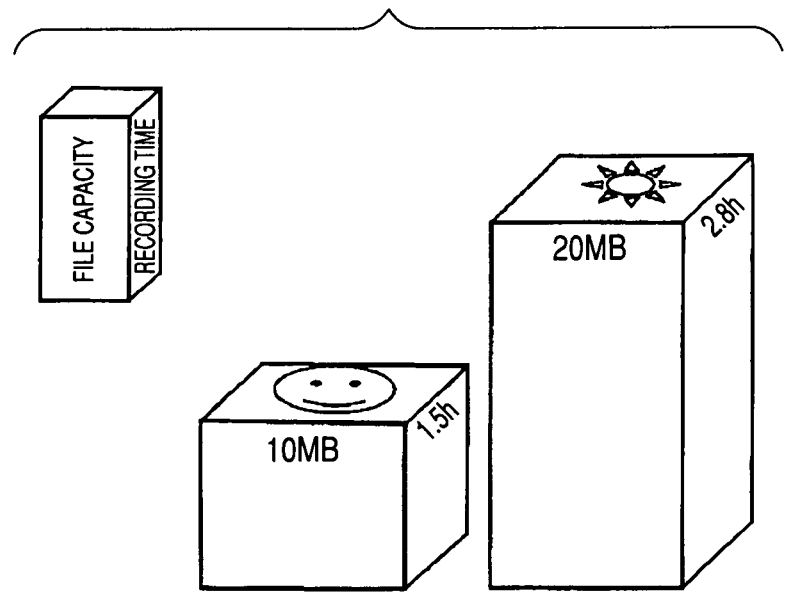
FIG. 11 shows a diagram illustrative of other exemplary rectangular parallelepipeds which display information about folders.

FIG. 11 shows a diagram illustrative of other exemplary rectangular parallelepipeds displayed by clicking "the file capacity" displayed on the side surface of the rectangular parallelepiped upper left in FIG. 10, on which information about a folder is displayed.

As similar to FIG. 10, the rectangular parallelepiped upper left shown in FIG. 11 is a rectangular parallelepiped for describing information displayed on the side surfaces of the two rectangular parallelepipeds at the center. In other words, in FIG. 11, among the side surfaces of the rectangular parallelepiped upper left, "the file capacity" is displayed on the front surface, and "the recording time" is displayed on the right surface adjacent to the front surface. Thus, the file capacity of the contents recorded in the folder corresponding thereto is displayed on the front surface of each of the two rectangular parallelepipeds at the center, and the recording time of the contents recorded in the folder corresponding thereto is displayed on the right surface adjacent to the front surface of each of the two rectangular parallelepipeds at the center. In addition, the representative image of images displayed in accordance with the image data recorded in the folder corresponding thereto is displayed on the top surface of each of the two rectangular parallelepipeds at the center.

In other words, the rectangular parallelepiped shown on the left of the two rectangular parallelepipeds at the center shown in FIG. 11 is that the rectangular parallelepiped shown on the left of the two rectangular parallelepipeds at the center shown in FIG. 10 is rotated so that the file capacity "10 MB" displayed on the right surface adjacent to the front surface is turned to the front surface. In addition, the rectangular parallelepiped shown on the right of the two rectangular parallelepipeds at the center shown in FIG. 11 is that the rectangular parallelepiped shown on the right of the two rectangular parallelepipeds at the center shown in FIG. 10 is rotated so that the file capacity "20 MB" displayed on the right surface adjacent to the front surface is turned to the front surface.

When a user clicks "the file capacity" displayed on the side surface of the rectangular parallelepiped upper left in FIG. 10, the information selecting part 88 selects information that indicates the file capacity "10 MB" of the folder corresponding to the rectangular parallelepiped shown on the left of the two rectangular parallelepipeds at the center, and information that indicates the file capacity "20 MB" of the folder corresponding to the rectangular parallelepiped shown on the right in accordance with the user instruction.

Then, the model generating part 85 generates a model of a rectangular parallelepiped having the height corresponding to the file capacity "10 MB" that is information selected by the information selecting part 88 as the rectangular parallelepiped shown on the left of the two rectangular parallelepipeds at the center shown in FIG. 11. In addition, the display control part 86 displays the file capacity "10 MB" on the front surface of the side surfaces of the rectangular parallelepiped as well as displays the recording time "1.5 h", not shown in FIG. 10, on the right surface adjacent to the front surface. In addition, the image "smile" displayed on the top surface is kept displayed.

In addition, the model generating part 85 generates a model of a rectangular parallelepiped having the height corresponding to the file capacity "20 MB" that is information selected by the information selecting part 88 as the rectangular parallelepiped shown on the right of the two rectangular parallelepipeds at the center shown in FIG. 11. In addition, the display control part 86 displays the file capacity "20 MB" on the front surface of the side surfaces of the rectangular parallelepiped as well as displays the recording time "2.8 h", not shown in FIG. 10, on the right surface adjacent to the front surface. In addition, the image "sun" displayed on the top surface is kept displayed.

Since the height of the two rectangular parallelepipeds at the center shown in FIG. 10 is the height corresponding to the number of files displayed on the front surface, the height of the rectangular parallelepiped shown on the left with a larger number of files is higher. However, since the height of the two rectangular parallelepipeds at the center shown in FIG. 11 is the height corresponding to the file capacity displayed on the front surface, the height of the rectangular parallelepiped shown on the right with a larger file capacity is higher.

In addition, when "the recording time", is clicked that is displayed on the side surface of the rectangular parallelepiped upper left in FIG. 11, the height of the rectangular parallelepiped on the left of the two rectangular parallelepipeds at the center shown in FIG. 11 is the height corresponding to the recording time "1.5 h", and the height of the rectangular parallelepiped on the right is the height corresponding to the recording time "2.8 h".

As described above, the digital camera 1 generates a model of a rectangular parallelepiped having the height corresponding to the file capacity of the contents recorded in the folder corresponding to each of the rectangular parallelepipeds, and displays the representative image of images displayed in accordance with the file capacity of the contents recorded in each of the folders, the recording time of the contents recorded in each of the folders, and the image data recorded in each of the folders by the generated rectangular parallelepipeds.

With this configuration, the digital camera 1 can display the rectangular parallelepiped having the height corresponding to information displayed on the front surface, on the surface of which a plurality of items of information about the folder are displayed for each of the folders in which data is recorded. In addition, the digital camera 1 can provide in advance information displayed on the surface other than the front surface of the rectangular parallelepiped, and can further provide a plurality of items of information by rotating the rectangular parallelepiped.

In addition, as described above, information about a folder displayed on the side surfaces of the rectangular parallelepiped is not restricted to the number of contents, the file capacity, or the recording time, for example, which may be the number of images on which a predetermined person is taken. In addition, the surface adjacent to the front surface of the side surfaces of the rectangular parallelepiped is not restricted to the right surface, which may be the left surface. Moreover, the representative image such as "smile" and "sun" displayed on the top surface of the rectangular parallelepiped may be read out by the image readout part 87, and displayed by the display control part 86.

In addition, in the discussion described above, the three dimensional model to be generated is described as a rectangular parallelepiped with rectangular top and bottom surfaces is displayed, the shape of which is not, however, restricted to a rectangle. Such a model is enough that displays a three dimensional image having surfaces such as a flat surface and a curved surface in accordance with the information about the group. For example, such a model may be fine that displays a polygon prism with hexagonal or octagonal top and bottom surfaces, or that displays a column, a globe or an oval.

Moreover, such a model may be generated that displays a three dimensional image in the similar shape as the shape of a three dimensional image such as a rectangular parallelepiped or a globe. More specifically, in the case in which a three dimensional image is a globe, the radius of the globe may be changed in accordance with the information about the group. In this case, since the shape is changed three dimensionally, a user can grasp the change by more intuition than the user grasps the change in the height of a rectangular parallelepiped.

As described above, in the case in which display of information about data is controlled, information about data can be displayed. In addition, in the case of performing such control in which a three dimensional model for display is generated in accordance with a first item of information of information about a group and a second item of information that is information about the group and different from the first item of information is overlaid on the three dimensional image displayed based on the model, a plurality of items of information about the grouped data can be displayed more clearly.

A series of the process steps described above may be executed by hardware, or may be executed by software. In the case in which a series of the process steps is executed by software, a program configuring the software is installed in a computer incorporated in a dedicated hardware, or is installed from a program recording medium to a multi-purpose personal computer, for example, that can run various functions by installing various programs.

As shown in FIG. 1, a program recording medium which is installed in a computer and is executable by the computer and on which a program is stored is configured of the recording medium 20 which is a packaged medium formed of a magnetic disk (including a flexible disk), an optical disk (including CD-ROM (Compact Disc-Read Only Memory), and DVD (Digital Versatile Disc)), a magneto-optical disk, or a semiconductor memory, the RAM 53 in which the program is stored temporarily or permanently, and a hard disk configuring the flash ROM 54. The program is stored in the program recording medium through the use of the external I/F 19 such as an interface including a rooter and a modem, and through the use of a cable or radio communication medium such as a local area network, the Internet, and digital satellite broadcasting, as necessary.

In addition, in the specification, the steps describing the program to be stored on the program recording medium of course include the process steps performed in time series along the described order and also include the process steps performed individually or in parallel not necessarily processed in time series.

In addition, embodiments of the invention are not restricted to the embodiment described above, which may be modified variously within the scope not deviating from the teachings of an embodiment of the invention.

It should be understood by those skilled in the art that various modifications, combinations, sub-combinations and alterations may occur depending on design requirements and other factors insofar as they are within the scope of the appended claims or the equivalents thereof.

The invention claimed is:

1. A display control apparatus which controls display of information about groups of data each having a predetermined relevance, the apparatus comprising:
    means for generating a three dimensional model for display on a display area, the three dimensional model including a plurality of polyhedrons corresponding to the groups of data, each one of the polyhedrons having a dimension associated with a number of items in its corresponding group, the plurality of polyhedrons being arranged on the display area in accordance with a plurality of first items of information of the information corresponding to the groups;
    means for controlling display of a plurality of at least second and third items of information of the information corresponding to the groups and different from the first items of information so as to be overlaid on a three dimensional image displayed based on the model such that for each one of the plurality of polyhedrons, the second items of information corresponding to the corresponding group is overlaid on a first side surface of that polyhedron and the third items of information corresponding to the corresponding group is overlaid on a second side surface of that polyhedron;
    means for controlling display, on a further polyhedron, of corresponding descriptions of the at least second and third items of information which are overlaid on the side surfaces of the plurality of polyhedrons such that the description of the second items of information is overlaid on the first side surface of the further polyhedron and the description of the third items of information is overlaid on the second side surface of the further polyhedron; and
    means for selecting, in response to a user instruction, one of the first and second side surfaces of each one of the plurality of polyhedrons for display as a front surface and for setting, for each one of the plurality of polyhedrons, the height of each polyhedron in proportion to the number of items of information associated with the selected side surface of that polyhedron.

2. The display control apparatus according to claim 1, further comprising:
    means for selecting, in response to a user instruction, a plurality of fourth items of information of the information corresponding to the groups and different from the first items of information and the second items of information, wherein the generating means generates the model with the plurality of polyhedrons being arranged on the display area in accordance with the plurality of fourth items of information.

3. The display control apparatus according to claim 2, wherein the generating means generates a subsequent model that displays a three dimensional image in a shape similar to the shape of a three dimensional image displayed based on the model.

4. The display control apparatus according to claim 1, wherein the second items of information includes representative images that represents images displayed in accordance with data belonging to the groups on top surfaces of the polyhedrons.

5. A display control method of a display control apparatus which controls display of information about groups of data each having a predetermined relevance, the method comprising:

using a processor to carry out the following:
generating a three dimensional model for display on a display area, the three dimensional model including a plurality of polyhedrons corresponding to the groups of data, each one of the polyhedrons having a dimension associated with a number of items in its corresponding group, the plurality of polyhedrons being arranged on the display area in accordance with a plurality of first items of information of the information corresponding to the groups, controlling display of a plurality of at least second and third items of information of the information corresponding to the groups and different from the first items of information so as to be overlaid on a three dimensional image displayed based on the model such that for each one of the plurality of polyhedrons, the second items of information corresponding to the corresponding group is overlaid on a first side surface of that polyhedron and the third items of information corresponding to the corresponding group is overlaid on a second side surface of that polyhedron, controlling display, on a further polyhedron, of corresponding descriptions of the at least second and third items of information which are overlaid on the side surfaces of the plurality of polyhedrons such that the description of the second items of information is overlaid on the first side surface of the further polyhedron and the description of the third items of information is overlaid on the second side surface of the further polyhedron, and selecting, in response to a user instruction, one of the first and second side surfaces of each one of the plurality of polyhedrons for display as a front surface and setting, for each one of the plurality of polyhedrons, the height of each polyhedron in proportion to the number of items of information associated with the selected side surface of that polyhedron.

6. A processor encoded with a program to execute a method for controlling display of information about groups of data each having a predetermined relevance, the method comprising:

generating a three dimensional model for display on a display area, the three dimensional model including a plurality of polyhedrons corresponding to the groups of data, each one of the polyhedrons having a dimension associated with a number of items in its corresponding group, the plurality of polyhedrons being arranged on the display area in accordance with a plurality of first items of information of the information corresponding to the groups;

controlling display of a plurality of at least second and third items of information of the information corresponding to the groups and different from the first items of information so as to be overlaid on a three dimensional image displayed based on the model such that for each one of the plurality of polyhedrons, the second items of information corresponding to the corresponding group is overlaid on a first side surface of that polyhedron and the third items of information corresponding to the corresponding group is overlaid on a second side surface of that polyhedron;

controlling display, on a further polyhedron, of corresponding descriptions of the at least second and third items of information which are overlaid on the side surfaces of the plurality of polyhedrons such that the description of the second items of information is overlaid on the first side surface of the further polyhedron and the description of the third items of information is overlaid on the second side surface of the further polyhedron; and selecting, in response to a user instruction, one of the first and second side surfaces of each one of the plurality of polyhedrons for display as a front surface and setting, for each one of the plurality of polyhedrons, the height of each polyhedron in proportion to the number of items of information associated with the selected side surface of that polyhedron.

7. A display control apparatus which controls display of information about groups of data each having a predetermined relevance, the apparatus comprising:

a processor, including:
a generating unit configured to generate a three dimensional model for display on a display area, the three dimensional model including a plurality of polyhedrons corresponding to the groups of data, each one of the polyhedrons having a dimension associated with a number of items in its corresponding group, the plurality of polyhedrons being arranged on the display area in accordance with a plurality of first items of information of the information corresponding to the groups, a display control unit configured to control display of a plurality of at least second and third items of information of the information corresponding to the groups and different from the first items of information so as to be overlaid on a three dimensional image displayed based on the model such that for each one of the plurality of polyhedrons, the second items of information corresponding to the corresponding group is overlaid on a first side surface of that polyhedron and the third items of information corresponding to the corresponding group is overlaid on a second side surface of that polyhedron, a further display control unit configured to control display, on a further polyhedron, of corresponding descriptions of the at least second and third items of information which are overlaid on the side surfaces of the plurality of polyhedrons such that the description of the second items of information is overlaid on the first side surface of the further polyhedron and the description of the third items of information is overlaid on the second side surface of the further polyhedron, and a selecting unit configured to select, in response to a user instruction, one of the first and second side surfaces of each one of the plurality of polyhedrons for display as a front surface and to set, for each one of the plurality of polyhedrons, the height of each polyhedron in proportion to the number of items of information associated with the selected side surface of that polyhedron.

8. The display control apparatus according to claim 1, wherein the groups are one or more of still images grouped according to date taken, still images grouped according to month taken, moving images grouped according to date taken, moving images grouped according to month taken, or collections of items of data grouped according to a particular condition.

9. The display control apparatus according to claim 1, wherein the plurality of first items of information corresponding to the groups are days of a given month or months of a given year, and the generating means arranges the plurality of polyhedrons in accordance with the days of the given month or the months of the given year.

10. The display control apparatus according to claim 7, further comprising:
a further selecting unit that selects, in response to a user instruction, a plurality of fourth items of information of the information corresponding to the groups and different from the first items of information and the second items of information,
wherein the generating unit generates the model with the plurality of polyhedrons being arranged on the display area in accordance with the plurality of third items of information.

11. The display control apparatus according to claim 10, wherein the generating unit generates a subsequent model that displays a three dimensional image in a shape similar to the shape of a three dimensional image displayed based on the model.

12. The display control apparatus according to claim 7, wherein the second items of information includes representative images that represent images displayed in accordance with data belonging to the groups on top surfaces of the polyhedrons.

13. The display control apparatus according to claim 7, wherein the groups are one or more of still images grouped according to date taken, still images grouped according to month taken, moving images grouped according to date taken, moving images grouped according to month taken, or collections of items of data grouped according to a particular condition.

14. The display control apparatus according to claim 7, wherein the plurality of first items of information corresponding to the groups are days of a given month or months of a given year, and the generating unit arranges the plurality of polyhedrons in accordance with the days of the given month or the months of the given year.

15. The display control apparatus according to claim 1, wherein the second items of information are information about a ratio between types of data belonging to the group, and the ratio between types of the data corresponding to the corresponding group is overlaid on a side surface of its polyhedron such that the side surface is divided into at least two different colored, stacked portions whose respective heights correspond to the ratio.

16. The display control method according to claim 5, wherein the second items of information are information about a ratio between types of data belonging to the group, and the ratio between types of the data corresponding to the corresponding group is overlaid on a side surface of its polyhedron such that the side surface is divided into at least two different colored, stacked portions whose respective heights correspond to the ratio.

17. The processor according to claim 6, wherein the second items of information are information about a ratio between types of data belonging to the group, and the ratio between types of the data corresponding to the corresponding group is overlaid on a side surface of its polyhedron such that the side surface is divided into at least two different colored, stacked portions whose respective heights correspond to the ratio.

18. The display control apparatus according to claim 7, wherein the second items of information are information about a ratio between types of data belonging to the group, and the ratio between types of the data corresponding to the corresponding group is overlaid on a side surface of its polyhedron such that the side surface is divided into at least two different colored, stacked portions whose respective heights correspond to the ratio.

19. The display control apparatus according to claim 1, wherein the means for selecting, in response to an initial user instruction, selects one side surface of each one of the plurality of polyhedrons for display as the front surface and sets the height of each polyhedron in proportion to the number of items of information associated with the selected side surface of that polyhedron, and in response to a subsequent user instruction, selects another side surface of each one of the plurality of polyhedrons for display as the front surface and resets the height of each polyhedron in proportion to the number of items of information associated with the subsequently selected side surface of that polyhedron.

20. The display control method according to claim 5, wherein the selecting step, in response to an initial user instruction, selects one side surface of each one of the plurality of polyhedrons for display as the front surface and sets the height of each polyhedron in proportion to the number of items of information associated with the selected side surface of that polyhedron, and in response to a subsequent user instruction, selects another side surface of each one of the plurality of polyhedrons for display as the front surface and resets the height of each polyhedron in proportion to the number of items of information associated with the subsequently selected side surface of that polyhedron.

21. The processor according to claim 6, wherein the selecting step, in response to an initial user instruction, selects one side surface of each one of the plurality of polyhedrons for display as the front surface and sets the height of each polyhedron in proportion to the number of items of information associated with the selected side surface of that polyhedron, and in response to a subsequent user instruction, selects another side surface of each one of the plurality of polyhedrons for display as the front surface and resets the height of each polyhedron in proportion to the number of items of information associated with the subsequently selected side surface of that polyhedron.

22. The display control apparatus according to claim 7, wherein the selecting unit, in response to an initial user instruction, selects one side surface of each one of the plurality of polyhedrons for display as the front surface and sets the height of each polyhedron in proportion to the number of items of information associated with the selected side surface of that polyhedron, and in response to a subsequent user instruction, selects another side surface of each one of the plurality of polyhedrons for display as the front surface and resets the height of each polyhedron in proportion to the number of items of information associated with the subsequently selected side surface of that polyhedron.

* * * * *